(12) United States Patent
Scherzer

(10) Patent No.: US 7,167,964 B1
(45) Date of Patent: Jan. 23, 2007

(54) MEMORY DEFRAGMENTATION IN CHIPCARDS

(75) Inventor: Helmut Scherzer, Tuebingen (DE)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/533,731

(22) Filed: Mar. 23, 2000

(30) Foreign Application Priority Data

Mar. 23, 1999 (EP) .............................. 99105816

(51) Int. Cl.
G06F 12/00 (2006.01)

(52) U.S. Cl. ............... 711/165; 711/103; 711/133; 711/170; 711/159; 711/139

(58) Field of Classification Search ............ 711/103, 711/165, 133, 170, 159, 139, 102, 104
See application file for complete search history.

(56) References Cited

U.S. PATENT DOCUMENTS 6,038,636 A * 4/2000 Brown, III et al. ......... 711/103

* cited by examiner

Primary Examiner—Do Hyun Yoo
Assistant Examiner—Kimberly McLean
(74) Attorney, Agent, or Firm—Lisa M. Yamonaco

(57) ABSTRACT

The basic idea comprised of the present invention is to provide two sets of descriptors having each at least three descriptors and each set is used in an alternating manner for defining the location of source and target of the copy operations which are to be performed during the defragmentation procedure. The defragmentation procedure is performed as a sequence of copy operations on copy chunks, i.e., a certain number of sequentially arranged bytes to be copied being part of a valid data block to be copied. In each of said copy operations in said sequence the values which are assigned to said descriptors Change. According to a characterizing feature of the present invention during the whole sequence of copy operations comprised of the defragmentation process one of the two sets of descriptors holds information which is usable for restoring the contents of a copy chunk in case of a power break during a copy operation on said copy chunk. Thus, defragmenting is a safe procedure, and data integrity is assured.

6 Claims, 4 Drawing Sheets

MEMORY DEFRAGMENTATION IN CHIPCARDS

BACKGROUND OF THE INVENTION

1. Field of the Invention

The invention relates generally to system software of computer systems, and deals more particularly with a method and system for improving memory defragmentation, particularly enabling chipcards to be defragmented.

2. Description and Disadvantages of Prior Art

A new area of technology with increasing importance is represented by the increasing use and acceptance of chipcards, sometimes called SmartCards and their applications for many different purposes.

Memory is a limited resource on chipcards. Thus, an optimum efficient usage of memory has to be envisaged generally.

During the usage of a chipcard repeated memory allocation operations are required for storing fresh data and repeated memory deallocation operations are required after deleting data in the memory of the chipcard. After a certain amount of usage in most chipcards the memory is used ineffectively as it is 'fragmented', i.e., there are a number of 'valid' data blocks distributed over the entire memory having 'holes' between them which are only difficult to use for further storage of data. For a right understanding of the wording provided herein it should be noted that a valid data block is meant to be a conventional set of data standing generally in a semantic context. 'Valid' is used for indicating that the contents of said block needs to be used by a program accessing the memory. 'Valid' stands in contrast to 'hole', indicating that in hole positions are no valid data, i.e., the unused gaps between the valid data blocks the use of the total size of them is the aim of the defragmentation procedure. Depending on the size of the data set being represented by the valid data block and the size of the copy chunks a copy operation of an entire data block can comprise a plurality of copy chunks, e.g., when the chunks are relatively small compared to the data block. In reverse, a whole data block can be contained in a single copy chunk, too. In application to SmartCards the memory is often an EEPROM and is divided into EEPROM pages as sub-unit having a size of e.g., 64 byte.

Today's Chipcards-have different flavors of memory organization. The EEPROM memory is a non-volatile memory which keeps personalized data of the chipcard holder. The typical applications today store a file system into the card which is more or less described in the ISO 7816/4 standard.

Other implementations might involve any blocks of data to be stored in the EEPROM. A general problem exists as mentioned above, whenever such blocks are deleted. This problem. is called the fragmentation of memory. It appears on deletion of a block. When a memory block or a file is deleted a 'hole' of unused memory is generated. New blocks being created may be larger than this hole, then they have to be allocated to the remaining free memory. If the newly created block is smaller than the existing hole it might fit in this or another hole, there will, however, in most of cases be another smaller hole created which results from the difference of the block size of the new block and the deleted block.

If blocks are deleted throughout the card's memory and other blocks are created frequently, the chipcard might contain an essential amount of unused memory holes which cannot be allocated as each of them is smaller than a requested block size. In this situation the chipcard would have to be fragmented in order to allocate additional memory space thereafter.

There are different approaches to reduce the impact of fragmentation. The memory may be organized in segments and each requested block is split up in sub-blocks of one segments size. This however leaves a hole of up to one segments size-one hole on each allocated block. Therefore this method is less effective for using the memory exhaustively. In Germany, the chipcard manufacturer ODS uses this system.

Another approach to reduce the impact of fragmentation is, to seek for that hole existing in the chipcard whose size does have the least difference from the requested block size, assumed, that the block size is yet smaller than the selected hole. This method is called the 'Best-Fit-Algorithm' and is the best known method to keep the impact of fragmentation small.

one obvious idea to solve the fragmentation problem is the defragmentation of the memory. Defragmentation per se is well known for hard disk drives, but not for chipcards. Available programs for hard disk defragmentation have been sold by different manufactures. Generally, the process of defragmentation copies the used memory blocks such, that the holes between two adjacent blocks are filled. After defragmentation all blocks are in continuos order, and no holes exist anymore between the blocks.

Defragmentation in chipcards, however, has been considered as not feasible by the state of the art operating system technology. Not feasible means that until now no approach has been presented which could be realized with an appropriate effort and performance and which could thus be applied within the limits of the available ROM on chipcards.

This situation is relevant for all currently discussed world wide projects, as e.g. JAVA cards, too, where the subject of 'garbage collection' could not be solved due to the existence of the defragmentation problem.

The defragmentation problem in chipcards appears in two flavors. The first problem comes from the organization of memory. Typically, the memory is organized such, that the physical addresses of memory locations are stored within the memory itself. A so-called 'descriptor' is intended to be general expression to mean any means for describing the location of a particular location in memory, and in particular pointers are thus understood by that. The descriptors mentioned during the course of description and in the claims are to be understood in that sense. Thus, a pointer is such a location which stores an address of another memory location. As most memory architectures are designed as 'linked lists' which is one of the most effective memory architectures those addresses are distributed all over the memory.

Also the file access mechanisms use fixed physical addresses in order to use files or blocks allocated in memory. A defragmentation of the memory would move memory blocks within the whole EEPROM range. Consequently, all references to physical addresses would have to be updated in the chipcard. This requires a high programming effort and will decrease the performance significantly as in most of the cases it will be impossible to reach two addresses to be written within one EEPROM page.

The other and decisive flavor of the defragmentation problem represents a problem which is much more difficult to solve during defragmentation of clipcards. Independent of the organization of the memory the defragmentation will always have to copy large chunks of memory. However, chipcards must be 100% resistant against power failure, i.e., any kind of power break-those generated by accident or others generated by intention during an attack to the card, for example.

Consequently it must be possible on a power break, to reconstruct the memory layout of the chipcard as to the beginning or to the end of the defragmentation.

The well known way to do the restoring is realized by so-called Backtrace or Write Forward Buffers, a reserved memory location in EEPROM which allows to hold the data layout prior to any alteration of the EEPROM. Those-buffers, however, cannot work in chipcards as their size must be larger than the size of any copied EEPROM range As during a complete defragmentation process up to the whole EEPROM range might have to be copied, e.g., If a hole is in the very beginning of the EEPROM, and the memory space is a very limited resource on chipcards it is impossible to provide an appropriate Backtrace or write forward buffer to restore the EEPROM information after a possible power break.

Thus, in the state-of-the-art technology it is not possible to perform a defragmentation of the EEPROM in chipcards by keeping the rules of 100% power failure resistance.

OBJECTS OF THE INVENTION

It is thus the object of the present invention to provide a defragmentation method which requires only a minimum of programming effort and of additional memory space beyond the memory space being object to the defragmentation process while keeping the rules of 100% power failure resistance.

It is a further object of the present invention to provide a method and system for defragmenting memory devices in. computing devices having reduced hardware and software resources available while keeping the rules of 100% power failure resistance.

SUMMARY AND ADVANTAGES OF THE INVENTION

Said objects of the invention are achieved by the features stated in enclosed independent claims. Further advantageous arrangements and embodiments of the invention are set forth, in the respective subclaims.

The basic idea comprised of the present invention is to provide two sets of descriptors having each at least three descriptors and each set is used in an alternating manner for defining the location of source and target of the copy operations which are to be performed during the defragmentation procedure. The defragmentation procedure is performed as sequence of copy operations on copy chunks, i.e., a certain number of sequentially arranged bytes to be copied being part of a valid data block to be copied. In each of said copy operations in said sequence the values which are assigned to said descriptors change. According to a characterizing feature of the present invention during the whole sequence of copy operations comprised of the defragmentation process one of the two sets of descriptors holds information which is usable for restoring the contents of a copy chunk in case of a power break during a copy operation on said copy chunk. Thus, defragmenting is a safe procedure, and data integrity is assured. Basically, the provided solution is not limited to the use in chipcards as it can be applied in conventional computer systems, too. The advantageous area of application, however, are all devices having a reduced potential of hardware and software resources, compared, e.g. to state-of-the-art personal computer of the year 1999, as e.g. Pentium III. So, it is suited to be applied in many future 'mini'—computer devices, too, as they are developed in course of the next years It should be noted, however, that those comparisons need always to be considered as relative, i.e. the 'reduced potential' may increase during the next years, but should still be compared to the respective state-of-the-art computing devices of the future years.

According to the present invention a new solution to the defragmentation problem is provided which works with a high performance and which solves the defragmentation problem and all of its further concerns perfectly and to the whole extent.

In order to achieve the proposed solution the memory layout of the chipcard needs to be designed according to the following scheme:

Any reference to the EEPROM memory needs to be relative. The only fixed physical addresses may be those beyond, i.e., before or after that part of EEPROM which is subjected to the procedure of defragmentation. Within the range to be defragmented all addresses must be relative, i.e., a length of a block may be existing but not a physical address.

Furthermore, any memory block needs an identification code being represented by one or more bytes. This identification code replaces the usage of physical addresses. If memory addressing is required, e.g. due to the selection of a file or a memory block the whole EEPROM needs to be searched from the beginning until the appropriate identification code is being found.

Referring to a further aspect of the present invention a method to significantly increase the performance of said search procedure Is provided, too.

No other part of the ROM code may refer to any physical address in the defragmentation portion of the EEPROM.

A power failure buffer which has advantageously the size of one sub-unit of the EEPROM, i.e. a page, e.g., of 32 or 64 bytes length, must be implemented such that on a power break the content of this backtrace buffer is written back to the physical address being assigned for the stored data. Basically, said buffer can be used as backtrace or, as a write forward buffer as well.

As an advantage to be associated to the inventional concepts chipcards can be defragmented which increases the usage value of them.

In particular, the defragmentation method in chipcards can be realized such that any power interruption at any time within the defragmentation process does not affect the data integrity of the chipcard.

Further a two-stage memory allocation is provided advantageously with a defragmentation process between a first unsuccessful attempt of memory allocation and second later attempt of memory allocation. Therewith, a defragmentation on-demand is realized.

Further, such a defragmentation method can be advantageously automatically started on demand, i.e.,when a trial to allocate memory was not successful, or, it can be driven by a host program's control command, or, by a user command, or any other event having a potential influence on memory availability.

BRIEF DESCRIPTION OF THE DRAWINGS

The present invention is illustrated by way of example and is not limited by the shape of the figures of the accompanying drawings in which.

DESCRIPTION OF THE PREFERRED EMBODIMENT

Figure 1:
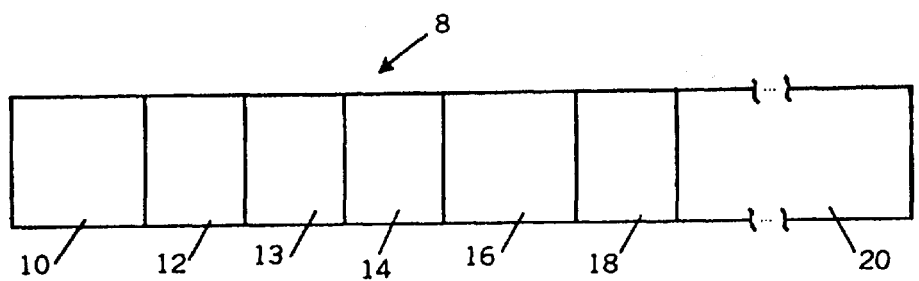
FIG. 1 is a schematic representation of the essential structure of a memory blocks used according to the present invention.

With general reference to the figures and with special reference now to FIG. 1 an example for the basic memory structure an allocated memory block 8 is given next below. Said memory block comprises a conventional header field 10 in order to fulfill conventional tasks within general memory management. Said header might be two bytes long and one of the bits may indicate, if the block is allocated or not.

A field 12 for the object ID comprising 1 byte in the present example is provided according to the present invention in order to identify the present memory block. This identification is a must as Its function principally consists in locating any particular memory block by searching the memory sequentially. In other words, said object ID replaces the functionality of a physical address in the memory. Advantageously, said ID is generated when the memory block is allocated.

Further, a field 13 of 1 byte is provided for holding the parent identification of the object in the hierarchically structured name space.

A field 14 is provided which holds information about the object type. This field is a conventional field and specifies if the memory block describes a file, or a directory or any other type of logical or physical devices in the computing unit.

Next, a field 16 for the file identification is provided. The file identification comprises two bytes which form the name of the file, directory, etc.

Further, there is provided a conventional field 18 holding file control information, and finally, in a field 20 the data of the block are found.

Figure 2:
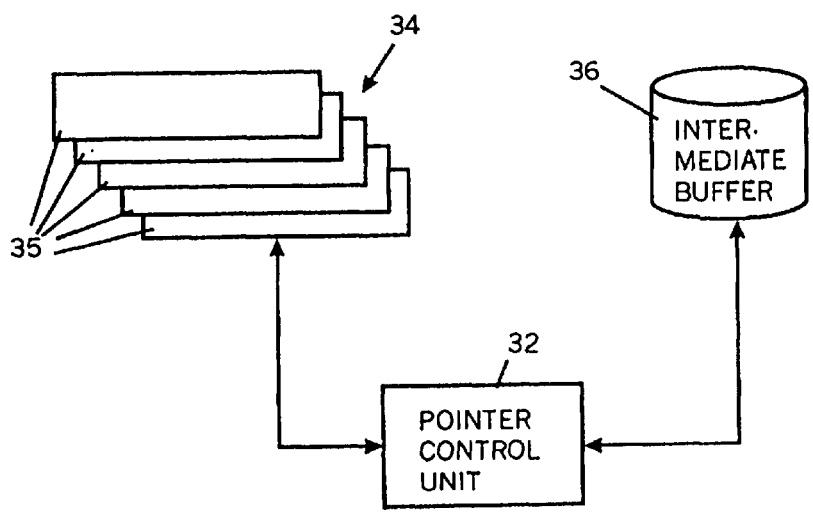
FIG. 2 is a schematic representation of the essential physical and logical elements which participate in the defragmentation process according to the present invention.

With reference to FIG. 2 and just describing logical aspects of the inventional concepts and not the real implementation in hardware a schematic representation of the essential physical and logical elements which participate in the defragmentation process according to the present invention is given:

The portion 34 of the memory to be defragmented according to the method of the present invention is structured in pages 35. The defragmentation process is controlled by a descriptor control unit 32. Said unit is connected to an intermediate buffer 36 which has the function of a conventional write forward buffer, or a backtrace buffer. Principally, both ways can be taken. The operations described later with reference to FIG. 3 is realized using the connections between the memory and the control unit, and the control unit and the back trace buffer, respectively.

Figure 3A:
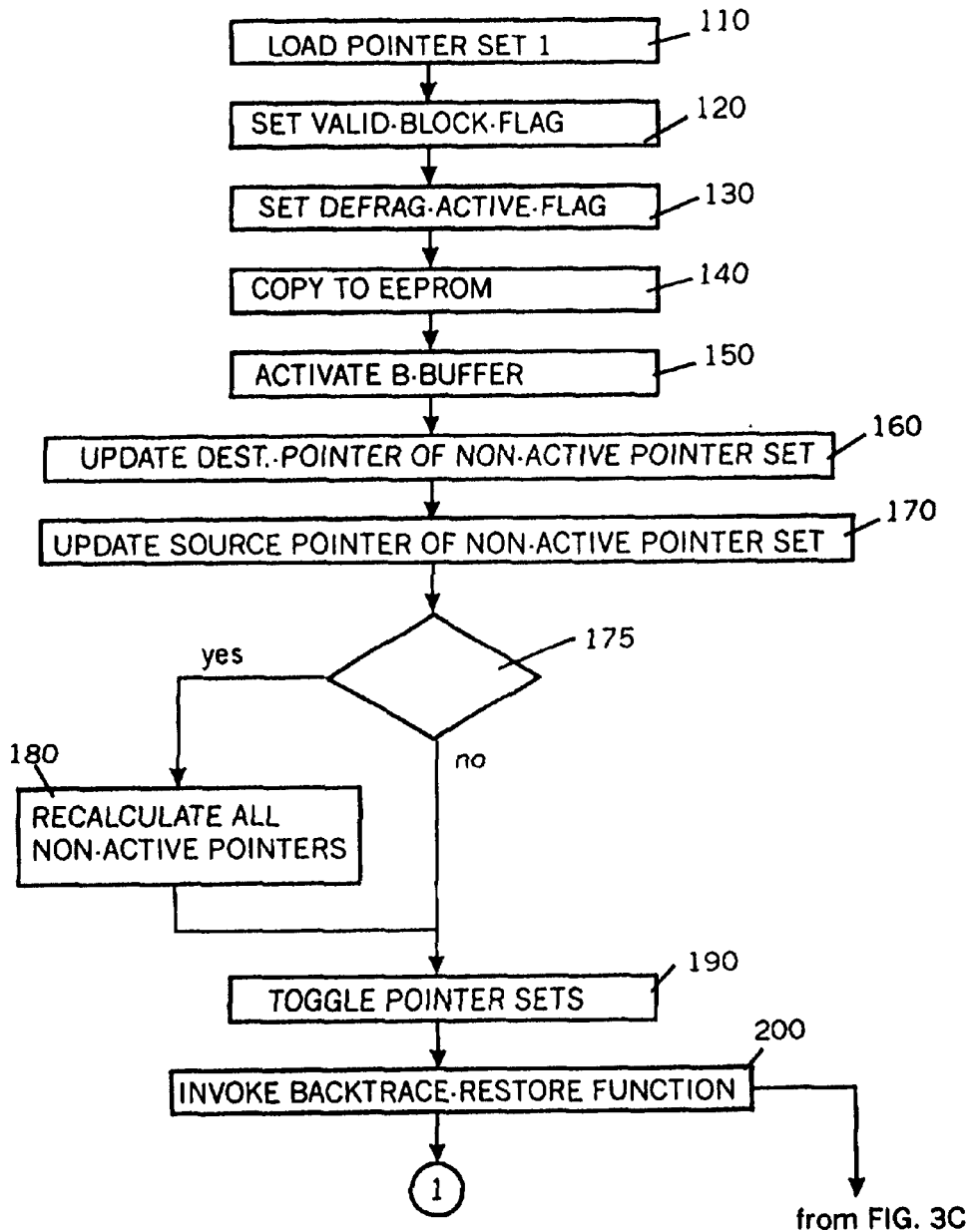
FIG. 3 is a schematic representation of the essential steps during defragmentation including the essential features of the corresponding control flow.
Figure 3B:
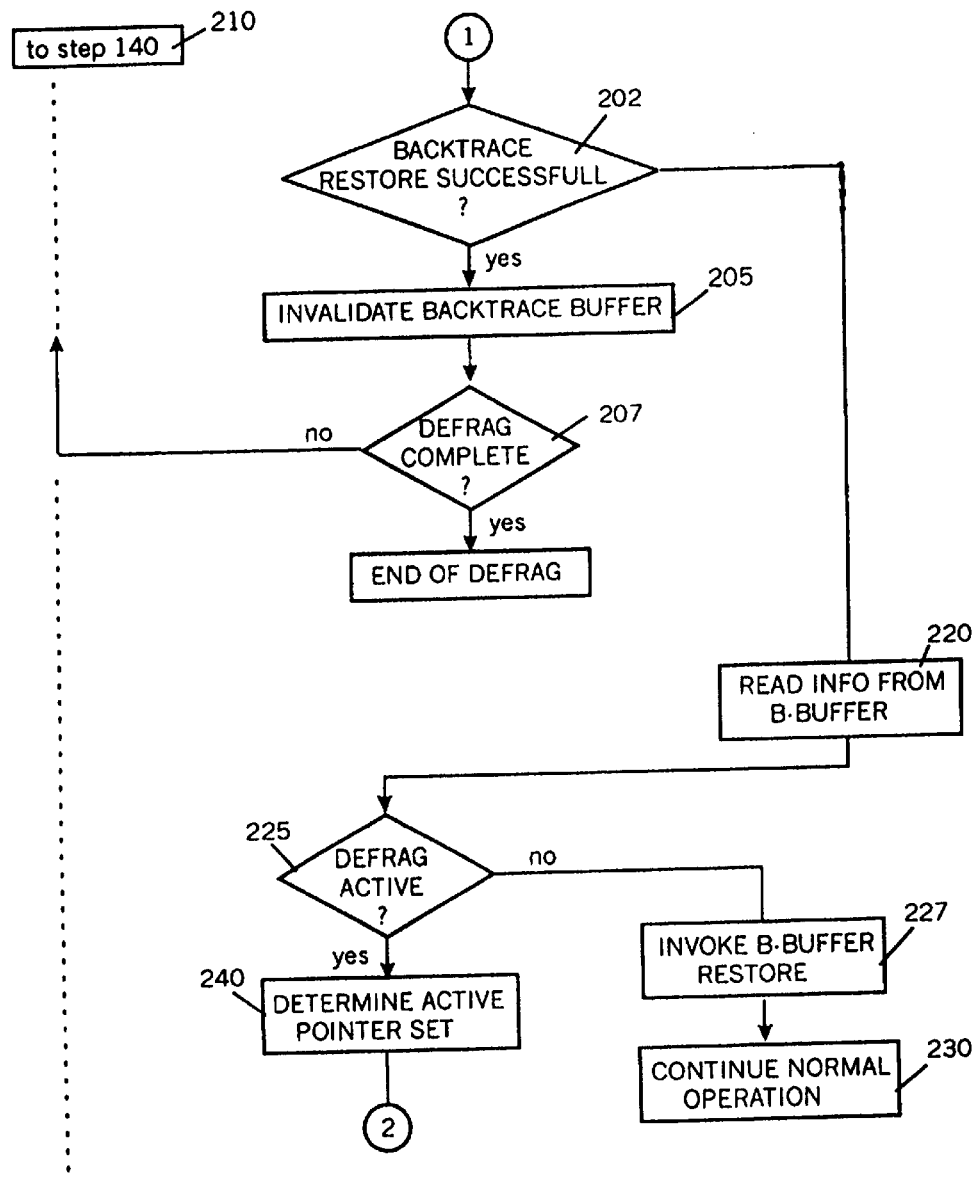
Figure 3C:
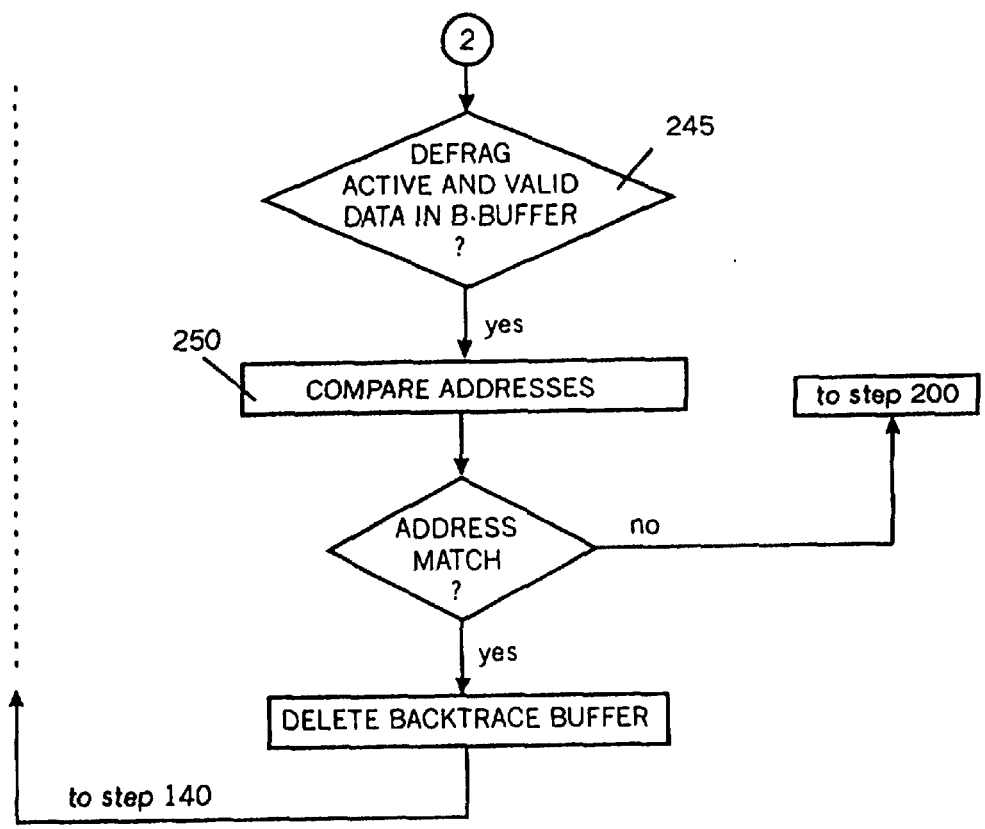

With reference to FIG. 3 a schematic representation of the essential steps during the inventional defragmentation process is given including the essential features of the corresponding control flow. The example refers to defragmentation of a defragmentable portion of a chipcard's EEPROM memory 34.

As defragmentation of the memory 34 always takes large portions of time it is important to avoid any unnecessary defragmentation. Unnecessary defragmentation is a defragmentation which is not necessary as there is still enough space to allocate a block. Consequently, defragmentation according to a preferred aspect of the present invention is recommended only when a memory allocation fails due to the fact that no more memory is available in the EEPROM.

If a block of memory is requested but no continuos memory of the requested length is available anymore in the chipcard, defragmentation is started. According to this patent proposal this has to be done by the steps described below. Two sets of three descriptors each are provided, each set of descriptors contains the following structure:

The first descriptor contains the physical address of the memory location to which the rest of the EEPPROM needs to be copied to i.e. the address of the first available hole. It is thus called DestinationPointer or TargetPointer for the purposes of description.

The second descriptor contains the physical address of the memory location from which the rest of the EEPROM should be copied i.e. the address of the memory allocation block after the first available hole. It is thus called SourcePointer.

The third descriptor contains the address of the second, i.e., next available hole. It is thus called NextPointer for the purposes of description. The length of bytes to be copied may be calculated by the difference from the third descriptor and the second descriptor.

The three descriptors are present twice as described above.

However only one set of descriptors is active at a time. Which set of descriptors is active is determined by an 'active block flag', this is one bit of another byte in EEPROM which automatically determines the validity of block set 1 and block set 2. As this bit can only be recognized as either '1' or '0' by definition of this system there is always one block being the active block. Thus, the flag is called a 'Valid Block Flag'.

Another flag being possibly represented through another byte in the EEPROM indicates, whether defragmentation is active. Thus, It is called 'DefragActive Flag'. The defragmentation is performed as is described in conjunction with the enumerated steps below:

Step 110: Load descriptor set 1 with the appropriate addresses (Source Pointer=start address of first hole, Target Pointer=address of valid block after hole, Next Pointer= address of next hole.

Step 120: Set the ValidBlockFlag to indicate the descriptor set 1 to be the active block.

Step 130: Set the DefragActive Flag to the status "Defragmentation Active".

Step 140: Copy a number of bytes up to the size of an EEPROM page to the Backtrace buffer. The start address of the bytes to be copied to the Backtrace Buffer is the address contained in the active Source Pointer.

Concerning now a special case not explicitly depicted in the drawings, in which the copy source overlaps with the end of the target, i.e., the copy-write operation overwrites the data of it's own source. For avoiding data loss the destination address of the entry in the backtrace buffer must be set to the content of the destination descriptor. Therefore the backtrace buffer is used in the function of a write-forward buffer in this case.

The length of bytes to be copied is determined by the address of the destination descriptor up to the address of the next EEPROM page boundary in order to copy the next block in chunks of the page size which will increase the speed of the defragmentation.

In case the NextPointer points to a lower value than the address of the next EEPROM page boundary the length of bytes is determined by the difference between the content of the NextPointer minus the content of the SourcePointer.

Step 150: activate the Backtrace buffer in order to allow storing the data into the destination address after a possible power break.

Any power failure will invoke the automatic restore function of the backtrace buffer such, that after a new power-on the data in the backtrace buffer will be copied automatically into the destination address of the backtrace record. This function is called the backtrace restore function.

Step 160: set the DestinationPointer of the non-active descriptor set to the value of the DestinationPointer plus the number of bytes in the Backtrace buffer. Now, the DestinationPointer points to the next location where to store the next data.

Step 170: Set the Source Pointer of the non-active descriptor set to the value of the SourcePointer of the active descriptor set plus the size of an EEPROM page.

Decision 175, Step 180: If the SourcePointer of the non-active descriptor set is larger than the NextPointer of the active descriptor set, then recalculate all non-active descriptors according to step 110.

Step, 190: Toggle the active descriptor set in order to make the non-active descriptor set being the active descriptor set and consequently the active descriptor set becomes the non-active descriptor set.

Step 200: Invoke the backtrace restore function as being performed after power on. This function copies the bytes of the backtrace record into the destination address which equals the content of the active Destinationpointer.

If the backtrace restore function was performed successfully, i.e., without any power break—decision 202—the backtrace record is made invalid—step 205 and the backtrace buffer is then automatically deleted.

Step 210: Continue the process at step 140 until the defragmentation is completed—decision 207.

After a power break situation the whole process is continued according to the information stored in and read from—step 220—the BacktraceBuffer, as are at least the DefragmentationActiveFlag, ValidBlockFlag and the appropriate active block step.

Whenever the chipcard receives the first command after the Answer To Reset it processes according to the following steps:

Step 225 to 230: Check whether the DefragActive Flag is set—decision 225, if no, invoke the backtrace restore function—step 227—and continue with normal operation—step 230.

Step 240: Otherwise determine the active descriptor set according to the ValidBlockFlag. Decision 245, Step 250: If the DefragActive Flag was found active, and the BackTraceBuffer contains valid data to be copied—decision 245—compare the address of the active Destination Pointer with the Destination address of the Backtrace Record—step 250. If the addresses match, delete the Backtrace Buffer and go to step 140 of the above scenarios.

If the addresses do not match, go to step 200 of the above scenarios.

The scenarios from step 110 to step 240 describe a full function solution to the Defragmentation problem working at high performance. Minor alterations of the scenarios are possible, e.g. the number of bytes to be copied to the backtrace buffer may be always the length of an EEPROM page where the source is being fetched always from valid blocks.

It should be noted that the descriptors need not necessarily contain the address information in form of pure addresses. Instead, they can contain relative distances between two physical addresses in order to be enabled to calculate a second physical address with the help of a first physical address and said distance bit length. In this context many modifications to the special descriptor layout are able to be appreciated by a person skilled in the art. All of them are deemed to be included in the scope of the claims as appended below.

Further variations and additional applications of the inventive concepts can be considered as useful, too:

A combination of the Best-Fit-Allocation mechanism can advantageously combined with the 'automatic' defragmentation method, , i.e., the on-demand feature of the present invention.

The defragmentation method can be provided such that it automatically resumes defragmentation after a power break.

The defragmentation method can be provided where multiple sets of descriptors are used in order to resume defragmentation after a power break.

The defragmentation method can be advantageously used in chipcards or other computer devices having a reduced potential of hardware or software resources, and any power backtrace/write forward buffer provided thereon can be used to store information relevant for the resume of the defragmentation.

Further, the inventional method of defragmenting memory can be implemented completely in hardware. Thus, a safe write operation can be assured.

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

What is claimed is:

1. Method for defragmenting a memory device (34) in which device a number of valid data blocks (8) are copied sequentially and stepwise as a sequence of copy chunks from a first position to a second, optimized position in said memory device (34), the method comprising the steps of:
using at least two sets of descriptors in an alternating manner, each set of descriptors being used for defining the source location and target location of respective copy chunks being copied during a first copy operation and the location of the destination of a second copy operation subsequent to the first copy operation;
the set of descriptors defining the copy chunk currently being copied being updated to define a later copy chunk to be copied only after said copy chunk currently being copied has been successfully copied and another one of said sets of descriptors is being used to define a next copy chunk being copied,
wherein one of the sets of descriptors always holds information used for restoring the contents of the copy chunk currently being copied in case of a power break during the copying thereof.

2. The method according to claim 1, in which a set of descriptors comprises at least three descriptors, said descriptors being provided for holding, information usable to define valid block positions and the positions of holes interposed between valid blocks.

3. The method according to claim 1, in which a set of descriptors comprises three descriptors, the set of descriptors being used for copying copy chunks, said set being organized such that a first one of the descriptors comprises information on the next hole position in the section of memory being subjected to the defragmentation procedure, and serving as a copy destination during the next copy operation, a second one of the descriptors comprising information on the start position of the copy chunk to be copied as a source during the next copy operation, a third one comprising information on the position of the next hole after said copy chunk.

4. The method according to claim 3, in which the size of said chunks corresponds to a memory sub-unit, such as an EEPROM page.

5. A method to operate a chipcard holding the memory (34) to be defragmented in which a method according to claim 1, is started automatically after a trial of memory allocation which could not be satisfied.

6. The method according to claim 5, of which the start is triggered on a program command issued by an application serving as a host for the computer device holding said memory to be defragmented, or on a predefined action of a user associated with the computer device holding said memory to be defragmented, or on any other predefined event.

* * * * *